(12) United States Patent
Iwamoto et al.

(10) Patent No.: US 10,018,879 B2
(45) Date of Patent: Jul. 10, 2018

(54) LIQUID CRYSTAL DISPLAY APPARATUS

(71) Applicant: STANLEY ELECTRIC CO., LTD., Meguro-ku, Tokyo (JP)

(72) Inventors: Yoshihisa Iwamoto, Tokyo (JP); Takahiro Matsuzaki, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/585,762

(22) Filed: May 3, 2017

(65) Prior Publication Data

US 2017/0336683 A1    Nov. 23, 2017

(30) Foreign Application Priority Data

May 19, 2016   (JP) ................ 2016-100057

(51) Int. Cl.
| | | |
|---|---|---|
| *G02F 1/1343* | (2006.01) |
| *G02F 1/1333* | (2006.01) |
| *G02F 1/1339* | (2006.01) |
| *G02F 1/1345* | (2006.01) |
| *G02F 1/1337* | (2006.01) |
| *G02F 1/1335* | (2006.01) |
| *G02F 1/137*  | (2006.01) |

(52) U.S. Cl.
CPC ...... *G02F 1/134327* (2013.01); *G02F 1/1339* (2013.01); *G02F 1/1345* (2013.01); *G02F 1/133345* (2013.01); *G02F 1/133528* (2013.01); *G02F 1/133784* (2013.01); *G02F 2001/13712* (2013.01); *G02F 2001/133531* (2013.01); *G02F 2001/133742* (2013.01); *G02F 2001/133746* (2013.01); *G02F 2201/121* (2013.01); *G02F 2201/503* (2013.01)

(58) Field of Classification Search
None
See application file for complete search history.

(56) References Cited

U.S. PATENT DOCUMENTS

| | | | | |
|---|---|---|---|---|
| 2013/0229610 A1* | 9/2013 | Iwamoto | ............... | G02F 1/1339 349/138 |
| 2014/0036215 A1* | 2/2014 | Iwamoto | ............... | G02F 1/1345 349/149 |

FOREIGN PATENT DOCUMENTS

| | | |
|---|---|---|
| JP | 10010551 A | 1/1998 |
| JP | 2008040307 A | 2/2008 |
| JP | 2008170812 A | 7/2008 |

* cited by examiner

*Primary Examiner* — Richard Kim
(74) *Attorney, Agent, or Firm* — Holtz, Holtz & Volek PC (57) ABSTRACT

To further reduce time necessary to eliminate the problem caused by static electricity. The liquid crystal display apparatus includes a plurality of unit display regions and the plurality of unit display regions are arranged along a first direction spaced from one another. At least one of a plurality of first electrodes has a plurality of electrode parts corresponding to each of the plurality of unit display regions and are mutually separated and arranged apart from one another in the first direction, a plurality of first lead wirings where each first lead wiring extends in the direction different from the first direction and extends outside an inner area, and a first crossover wiring disposed outside the inner area and mutually connects the plurality of first lead wirings.

9 Claims, 10 Drawing Sheets

LIQUID CRYSTAL DISPLAY APPARATUS

BACKGROUND OF THE INVENTION

Field of the Invention

The present invention relates to a technique for suppressing a problem due to the static electricity caused by external factors in a segment display type liquid crystal display apparatus.

Description of the Background Art

In general, a liquid crystal display apparatus includes a pair of substrates, electrodes provided to one surface of each of the substrates, and a liquid crystal layer disposed between the substrates, as a basic configuration. In such a liquid crystal display apparatus, for example, a protective film is often disposed on the surface of each polarizer to prevent the external portion from being damaged before use. In this case, when the protective film is peeled off from the polarizer, static electricity is generated and is charged on the liquid crystal display apparatus thereby, in the area which is primarily not intended for display (non-display part), changing the alignment state of the liquid crystal molecules in the liquid crystal layer, resulting in a state where change of display appearance is visually recognizable. In such a situation, it may take a long time until the changed state of the display appearance ceases. This problem is likely to occur due to the static electricity caused by not only when the protective film is peeled off from the polarizer, but also by external factors.

With reference to the problem due to the static electricity as described above, for example, Japanese Unexamined Patent Application Publication No. 2008-170812 discloses a liquid crystal display element where a grounding pattern for static electricity is formed on the outer peripheral portion of the liquid crystal display region, one end of the grounding pattern for static electricity is connected to a GND terminal, and the other end thereof is electrically opened. By destaticizing the element and increasing the noise resistance thereof, the occurrence of display malfunctions is suppressed.

Also, for example, Japanese Unexamined Patent Application Publication No. H10-010551 discloses a liquid crystal display element where a pair of dummy electrodes insulated from respective electrodes and prolonged out from the inside of a liquid crystal sealed area to the outside of seal material are arranged on an upper substrate forming a signal electrode and a lower substrate forming a scan electrode insulated from respective electrodes, a point-shaped conductive member is set up between the dummy electrodes of the outside of at least the seal material, and by mutually electrically connecting between the dummy electrodes, electric charges accumulated on each of the substrates are moved.

Further, for example, Japanese Unexamined Patent Application Publication No. 2008-040307 discloses a structure of a liquid crystal display apparatus wherein (i) one of the transparent substrate is provided with a transparent electrode having a segment electrode consisting of an electrode representing a character and a graphic and a lead line, and a conductive film part formed independently of the segment electrode, (ii) the other transparent substrate is provided with a transparent electrode having a common electrode consisting of an electrode representing a character and a graphic and a lead line, and a conductive film part formed independently of the common electrode, and (iii) the conductive film parts are electrically connected.

Now, in a segment display type liquid crystal display apparatus, for instance, it is common for the apparatus to include a plurality of unit display regions combining a plurality of segment display sections where each region represents a symbol with a meaning (e.g., a number). For example, in a case of a segment display type liquid crystal display apparatus where a few numbers are represented, the above-stated a plurality of unit display regions where each region is configured by a plurality of segment display sections are arranged in line in the lateral direction.

In such a segment display type liquid crystal display apparatus, the above-described prior arts are not sufficient to cope with the static electricity problem, and there may be a display problem, in a plan view, in the areas between the unit display regions and/or in the inner areas of each of the unit display regions (areas surrounded by a plurality of segment display sections).

SUMMARY OF THE INVENTION

It is therefore an object of one aspect according to the present invention to provide a technique capable of further reducing time necessary to eliminate the problem caused by static electricity.

The liquid crystal display apparatus according to a specific mode of the present invention includes (a) a first substrate having a plurality of first electrodes and a plurality of first dummy electrodes, (b) a second substrate having a plurality of second electrodes and a plurality of second dummy electrodes, (c) a liquid crystal layer disposed between the first substrate and the second substrate, (d) sealant provided between the a first substrate and the second substrate surrounding the liquid crystal layer, (e) a conductive part disposed in the vicinity of the sealant or included in the sealant to provide conduction between the first substrate and the second substrate, wherein (f) an inner area surrounded by the sealant includes a plurality of unit display regions where each of said plurality of unit display regions is a minimum region including all of a plurality of segment display sections where each of said plurality of segment display sections represents a symbol with a meaning, and each of said plurality of unit display regions is arranged along a first direction spaced from one another, (g) each of said plurality of segment display sections is defined as the area where one of said plurality of first electrodes and one of said plurality of second electrodes overlap, (h) at least one of said plurality of first electrodes has (i) a plurality of electrode parts corresponding to each of said plurality of unit display regions and are mutually separated arranged apart from one another in said first direction, (ii) a plurality of first lead wirings where each first lead wiring extends in the direction different from said first direction and extends outside said inner area, and (iii) a first crossover wiring disposed outside said inner area and mutually connects said plurality of first lead wirings.

According to the foregoing configuration, the degree of freedom of arrangement of the dummy electrodes is improved, and dummy electrodes can be arranged to areas between the unit display regions and/or inner-segment regions, etc. Thus, it is possible to further reduce time necessary to eliminate the problem caused by static electricity in areas between the unit display regions and/or inner-segment regions, etc.

DESCRIPTION OF THE PREFERRED EMBODIMENTS

Embodiment 1

Figure 1:
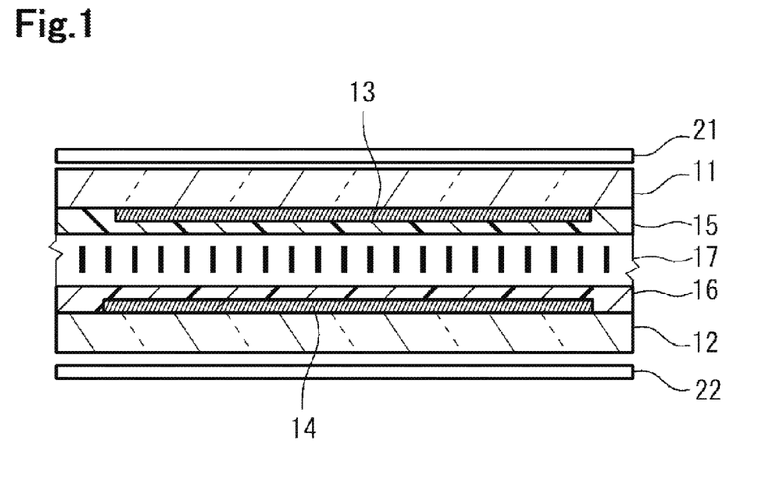
FIG. 1 is a cross-sectional view showing the configuration of the liquid crystal display apparatus of embodiment 1.

FIG. 1 is a cross-sectional view showing the configuration of the liquid crystal display apparatus of embodiment 1. A liquid crystal display apparatus includes a first substrate 11 and a second substrate 12 disposed facing each other, a first electrode 13 provided to the first substrate 11, a second electrode 14 provided to the second substrate 12, and a liquid crystal layer 17 disposed between the first substrate 11 and the second substrate 12, as a basic configuration. The liquid crystal display apparatus of this embodiment is configured so that the region where the electrodes overlap each other forms the characters and designs that the user wants to display and is basically capable of displaying only predetermined characters and the like. And it is an apparatus wherein a region of 70% or less at most, or generally a region of 50% or less in terms of the area ratio inside the effective display region contributes to the display of characters and the like. Note that the liquid crystal display apparatus may be a mixture of a segment display type and a dot matrix display type.

Each of the first substrate 11 and the second substrate 12 is a rectangular substrate when viewed in plane, disposed facing each other. The first substrate 11 and the second substrate 12 may each use a transparent substrate, such as a glass substrate, plastic substrate, or the like, for example. As shown, a plurality of spacers is dispersed uniformly and arranged between the first substrate 11 and the second substrate 12, for example, and as a result of these spacers, a predetermined gap (approximately a few μm, for example) is maintained between the two substrates.

The first electrode 13 is provided on one surface of the first substrate 11. Similarly, the second electrode 14 is provided on one surface of the second substrate 12. Each of the first electrode 13 and the second electrode 14 is configured, for example, by suitably patterning a transparent conductive film made of indium tin oxide (ITO) or the like. Although not shown in the figure, an insulating film may be provided on the upper surface of each of the electrodes.

A first alignment film 15 is provided to one surface side of the first substrate 11 so as to cover the first electrode 13. A second alignment film 16 is provided to one surface side of the second substrate 12 so as to cover the second electrode 14. As the first alignment film 15 and the second alignment film 16, used is a vertical alignment film for controlling the aligned state of the liquid crystal layer 17 to a vertically aligned state. On each of the first alignment film 15 and the second alignment film 16, a uniaxial orientation process such as a rubbing process is performed, thereby achieving alignment regulation force to one direction. The alignment treatment directions of the respective alignment films 15, 16 is set so that they become different from each other (anti-parallel), for example.

A liquid crystal layer 17 is provided between the first substrate 11 and the second substrate 12. In this embodiment, the liquid crystal layer 17 is configured using a liquid crystal material having fluidity (in other words, being a liquid) with a dielectric constant anisotropy $\Delta\in$ being negative, and with no chiral material contained. The liquid crystal layer 17 of this embodiment is in a state where the alignment direction of liquid crystal molecules is inclined to one direction when no voltage is applied, and is set to a substantially vertical orientation having a pretilt angle of 88° or more and less than 90° with respect to each substrate surface of the first substrate 11 and the second substrate 12. And when voltage is applied between the first electrode 13 and the second electrode 14, the liquid crystal molecules in the liquid crystal layer 17 are aligned in the direction controlled by the alignment processing.

A first polarizer 21 is disposed on the outside of the first substrate 11. Similarly, a second polarizer 22 is disposed on the outside of the second substrate 12. For instance, the first polarizer 21 and the second polarizer 22 are disposed so that the respective absorption axes are substantially perpendicular to each other. Further, an optical compensator, such as a C plate and the like may be suitably disposed between the polarizers and the substrates.

Figure 2:
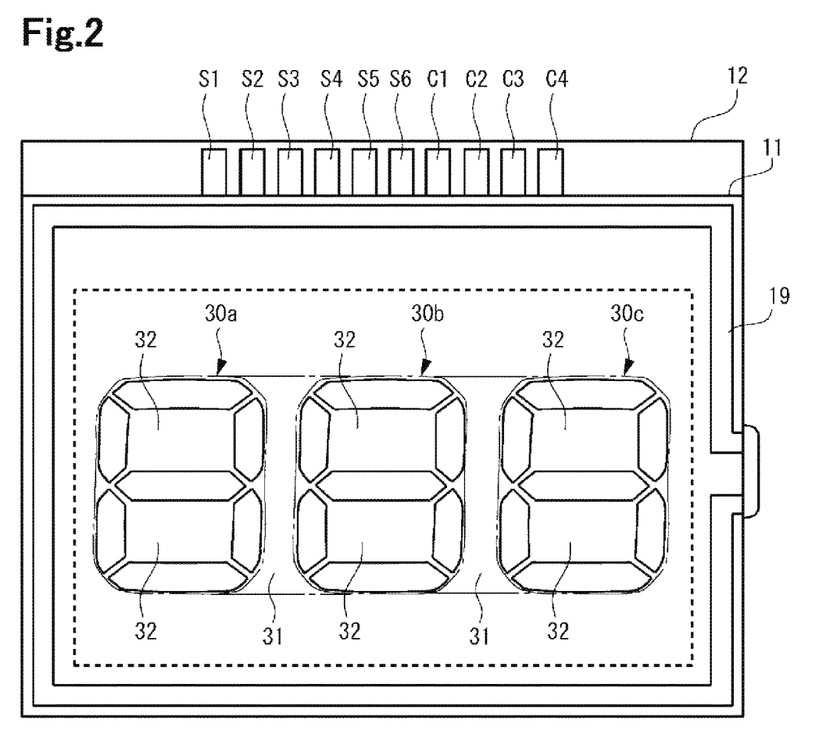
FIG. 2 is a plan view showing the configuration of the liquid crystal display apparatus of embodiment 1.

FIG. 2 is a plan view showing the configuration of the liquid crystal display apparatus of embodiment 1. As shown, the apparatus of this embodiment is a segment display type where a three-digit number is represented. The apparatus disposes three unit display regions in the lateral direction arranged apart from one another. Each of the unit display regions consists of seven segment display sections combined to represent a symbol with a meaning, in this case, a variable number. Each of the segment display sections constituting each of unit display regions 30a, 30b, 30c is defined as the area where one of the four of the first electrodes 13 which functions as a common electrode and one of the four of the second electrodes 14 which functions as a segment electrode overlap. Each of these segment display sections is multiplex driven and is capable of turning on and off independently.

Extraction electrodes C1, C2, C3, C4 are each provided at the upper end of one surface side of the second substrate 12. Each of these extraction electrodes C1-C4 provides a driving voltage to one of the first electrodes 13 which functions as a common electrode. Also, extraction electrodes S1, S2, S3, S4, S5, S6 are each provided at the upper end of one surface side of the second substrate 12. Each of these extraction electrodes S1-S6 provides a driving voltage to one of the second electrodes 14 which functions as a segment electrode.

Sealant 19 is provided in a frame shape almost along the outer edge at which the first substrate 11 and the second substrate 12 are superimposed on each other, fixing both substrates and enclosing the outer periphery of the liquid crystal layer 17 enclosed between the substrates. Further, on the right side in the figure, sealant 19 is provided linearly along the end, and is discontinued and opened at a portion of approximately the center. This opening is an injection port for forming the liquid crystal layer 17, and is sealed by a sealing member. Roughly, the inside region surrounded by sealant 19 corresponds to the effective display region (effective display part), and within the region, the part other than the segment display section is the non-display section where display change does not occur. Further, sealant 19 includes conductive particles such as carbon particles, silver particles, gold-coated particles and the like for example, and has anisotropic conductivity with conductivity only in the thickness direction (thickness direction of first substrate 11 and second substrate 12).

Here, "a unit display region" is defined as the minimum region that includes (that is, to surround) all the plurality of segment display sections needed to display a symbol which has a meaning, in a plan view, for example. Each of unit display regions 30a, 30b, 30c is within the inside region surrounded by sealant 19, and is arranged along one direction (horizontal direction in the figure) spaced from one another. Next, each of the regions between each of unit display regions 30a, 30b, 30c is defined as a inter-segment region 31. Further, each of the inner regions surrounded by the segment display sections of each of the unit display regions 30a, 30b, 30c is defined as a inner-segment region 32.

Here, "a inter-segment region" is defined as the region formed between the neighboring two of the unit display regions 30a, 30b, 30c, in plane view, for example. In the example shown in the figure, among each of the neighboring unit display regions 30a, 30b, 30c, inter-segment region 31 is defined as the region including the range where portions of the outer edges of each of the unit display regions 30a, 30b, 30c face each other, in plane view.

Here, "a inner-segment region" is defined as the region surrounded by a plurality of segment display sections within a unit display region (nearly closed region), in plane view, for example. In the example shown in the figure, in each of the unit display regions 30a, 30b, 30c, the inner-segment region 32 is defined as the region surrounded by the four segment display sections, and two inner-segment regions exist respectively in each of the unit display regions 30a, 30b, 30c.

The following describes in detail the configuration of the liquid crystal display apparatus capable of reducing time to eliminate the display problem caused by static electricity in inter-segment regions 31 and/or inner-segment regions 32.

Figure 3:
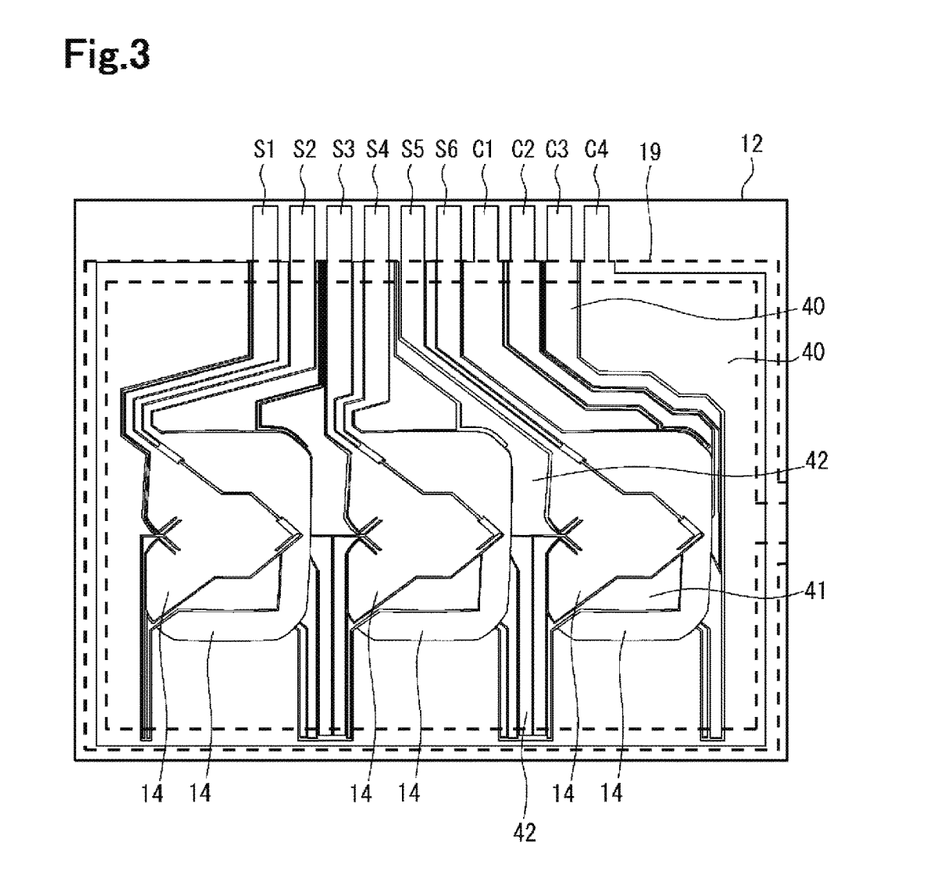
FIG. 3 is a plan view showing the configuration of the second substrate of the liquid crystal display apparatus of embodiment 1.

FIG. 3 is a plan view showing the configuration of the second substrate of the liquid crystal display apparatus of embodiment 1. In FIG. 3, the second substrate 12 is shown in a plan view from the side where second electrode 14 is formed. On one surface of the second substrate 12, a plurality of second electrodes 14 where each electrode functions as a segment electrode and dummy electrodes 40, 41, 42 are provided. As shown in the figure, nearly all the surface of the second substrate 12 is covered by each of the second electrodes 14 and each of the dummy electrodes 40, 41, 42. Here, "a dummy electrode" is an electrode which is not directly related to the display control of the segment electrode. (The same applies hereafter.)

Each of the second electrodes 14 is connected to one of the extraction electrodes S1-S6 via lead wirings. Voltage can be applied from an external drive unit (not shown) to each of the second electrodes 14, via these extraction electrodes S1-S6.

Dummy electrodes 40, 41, 42 are arranged to cover nearly the entire region other than the region where each of the second electrodes 14 exists. It should be noted that reference numerals are provided only to some of the dummy electrodes. The dummy electrode 40 is arranged so as to oppose the leading area of the first electrode 13 (common electrode) formed on the first substrate. The dummy electrode 41 is arranged so as to correspond to the inner-segment region 32. The dummy electrode 42 is arranged so as to correspond to the inter-segment region 31.

Figure 4:
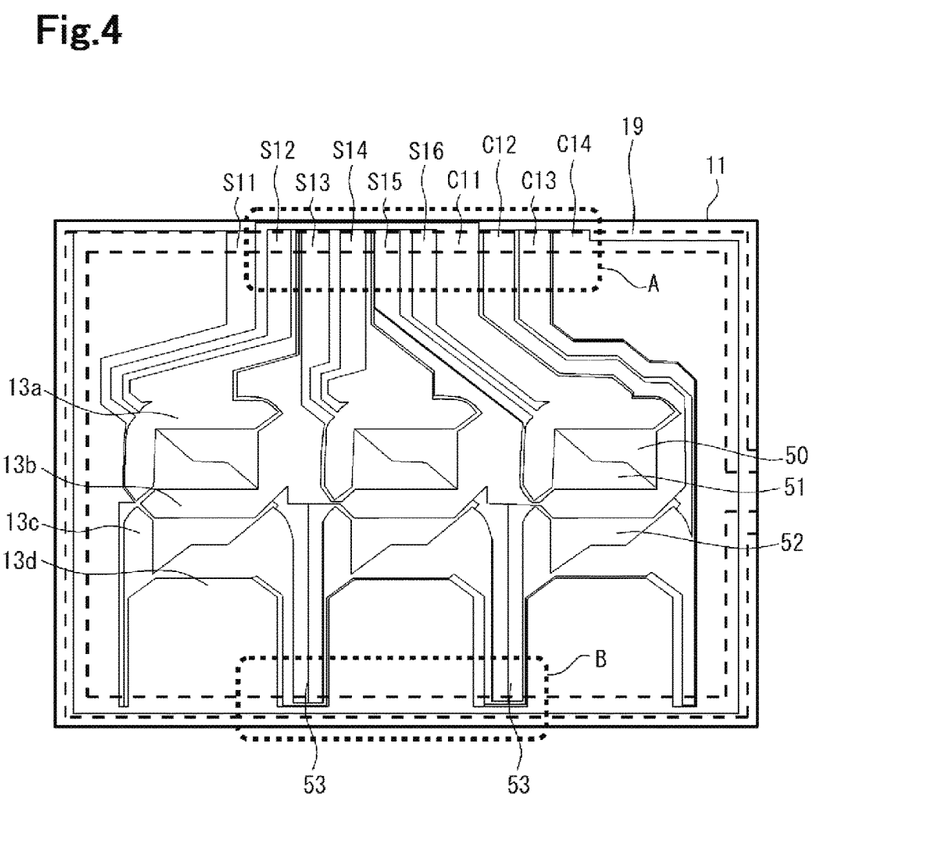
FIG. 4 is a plan view showing the configuration of the first substrate of the liquid crystal display apparatus of embodiment 1.

FIG. 4 is a plan view showing the configuration of the first substrate of the liquid crystal display apparatus of embodiment 1. In FIG. 4, the first substrate 11 is shown in a plan view from the opposite side of where the first electrodes 13 are formed. As shown in FIG. 4, on one surface of the first substrate 11, there are provided a plurality of first electrodes 13 where each electrode functions as a common electrode and dummy electrodes 50, 51, 52. As shown in the figure, nearly all the surface of the first substrate 11 is covered by each of the first electrodes 13 and each of the dummy electrodes 50, 51, 52. Here, each of the first electrodes 13 are arranged in the order of first electrode 13a, first electrode 13b, first electrode 13c, and first electrode 13d, from the top side to the bottom in the figure.

First electrode 13a is a common electrode which corresponds to the upper and the upper-left segment display section of each of the unit display regions 30a, 30b, 30c. The first electrode 13a has electrode parts which correspond to each of the unit display regions 30a, 30b, 30c. These electrode parts are mutually separated and independent from one another, and are arranged apart from one another, in the lateral direction in the figure where each of the unit display regions 30a, 30b, 30c are arranged. The first electrode 13a has a lead wiring extending in the vertical direction in the figure in which the direction crosses the lateral direction where each of the unit display regions 30a, 30b, 30c are arranged. And the lead wirings are mutually connected to one another via a crossover wiring provided outside the sealant 19 located on the upper side of the first electrode 11. Thus, the electrode parts corresponding to each of the unit display regions 30a, 30b, 30c of the first electrodes 13a are mutually electrically connected, and connected to a pad part C11 provided on the upper end of the first substrate 11 in the figure.

In this embodiment, the sealant 19 contains conductive particles thereby forming an anisotropic conductive part, providing electrical connection, but a method for providing electrical connection is not limited thereto. Electrical connection may be achieved by selectively disposing conductive material such as Ag paste, carbon paste, and the like to the area where electrical connection is needed by potting or screen printing. Conductive material such as Ag paste, carbon paste, and the like may be contained in the sealant 19 or may be disposed in the vicinity of the sealant 19.

First electrode 13b is a common electrode which corresponds to the center and the upper-right segment display section of each of the unit display regions 30a, 30b, 30c. The first electrode 13b has electrode parts which correspond to each of the unit display regions 30a, 30b, 30c. These electrode parts are mutually connected to one another via lead wirings, in the lateral direction in the figure where each of the unit display regions 30a, 30b, 30c are arranged, and are connected to a pad part C12. The first electrode 13b has lead wirings extending in the vertical direction in the figure. Each of the lead wirings extends to the upper side of the first electrode 11 and overlaps the sealant 19.

First electrode 13c is a common electrode which corresponds to the lower-left and the lower-right segment display section of each of the unit display regions 30a, 30b, 30c. The first electrode 13c has an electrode part which corresponds to each of the unit display regions 30a, 30b, 30c, and has lead wirings extending in the vertical direction in the figure. Each of the lead wirings extends to the lower side of the first electrode 11. In the region where the lead wirings overlap the sealant 19, the lead wirings are mutually connected via a crossover wiring. Also, the first electrode 13c is connected to a pad part C13.

First electrode 13d is a common electrode which corresponds to the lower segment display section of each of the unit display regions 30a, 30b, 30c. The first electrode 13d has electrode parts which correspond to each of the unit display regions 30a, 30b, 30c. These electrode parts are mutually separated and independent from one another, and are arranged apart from one another, in the lateral direction in the figure where each of the unit display regions 30a, 30b, 30c are arranged. The first electrode 13d has lead wirings extending in the vertical direction in the figure in which the direction crosses the lateral direction where each of the unit display regions 30a, 30b, 30c are arranged. And the lead wirings are mutually connected to one another via a crossover wiring which is provided overlapping the sealant 19 located on the lower side of the first electrode 11. Thus, the electrode parts corresponding to each of the unit display regions 30a, 30b, 30c of the first electrodes 13d are mutually electrically connected, and connected to a pad part C14 provided on the upper end of the first substrate 11 in the figure.

Dummy electrodes 50, 51, 52, 53 are arranged to cover nearly the entire region other than the region where each of the first electrodes 13 exists. It should be noted that reference numerals are provided only to some of the dummy electrodes. Each of the dummy electrodes 50, 51, 52 is arranged so as to correspond to the inner-segment region 32. These dummy electrodes 50, 51, 52 each has a lead wiring arranged along the vertical direction in the figure which extends to the top or the bottom of the first substrate 11. The dummy electrode 53 is arranged so as to correspond to the inter-segment region 31.

These dummy electrodes 50, 51, 52, 53 and the above-mentioned dummy electrodes 40, 41, 42 on the second substrate 12 are mutually electrically conducted or are electrically conducted through lead wirings connected to the first electrodes 13 or the second electrodes 14 via the sealant 19, and are brought to an equipotential. For example, one of the dummy electrodes 42 formed on the second substrate 12 (shown on the lower side in FIG. 3) and one of the dummy electrodes 53 formed on the first substrate 11 (shown on the lower side in FIG. 4) are mutually electrically conducted via the sealant 19 arranged on the lower side of each of the first substrate 11 and the second substrate 12. Thus, the inter-segment region 31 corresponding to the region where the dummy electrode 42 and the dummy electrode 53 overlap becomes equipotential.

Figure 5A:
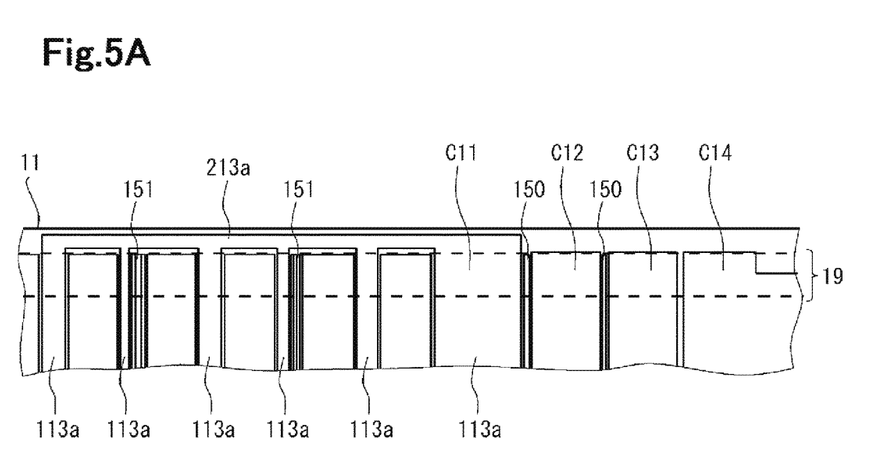
FIG. 5A is an enlarged view of area A shown in FIG. 4.

FIG. 5A is an enlarged view of area A shown in FIG. 4. As mentioned above, the first electrode 13a has a plurality of lead wirings 113a extending in the vertical direction in the figure, and each of the lead wirings 113a extends to the position where the lead wirings overlap the sealant 19. And the lead wirings 113a are mutually connected via a crossover wiring 213a disposed outside sealant 19 on the upper side of the first substrate 11. Thus, the electrode parts in first electrode 13a which corresponds to each of the unit display regions 30a, 30b, 30c are mutually electrically connected, and the electrode parts are connected to the pad part C11. Further, as shown in the figure, lead wirings 150 and 151 connected to the dummy electrode 50 and 51 respectively also extends to the position where the lead wirings overlap the sealant 19.

Since the crossover wiring 213a is disposed outside the sealant 19, the first substrate 11 and the second substrate 12 are not electrically conducted in this area, but in order to further lower the possibility of any electrical conduction, it is preferable to fill the gap between the two substrates with an insulation material such as an ultraviolet curing resin and the like.

Figure 5B:
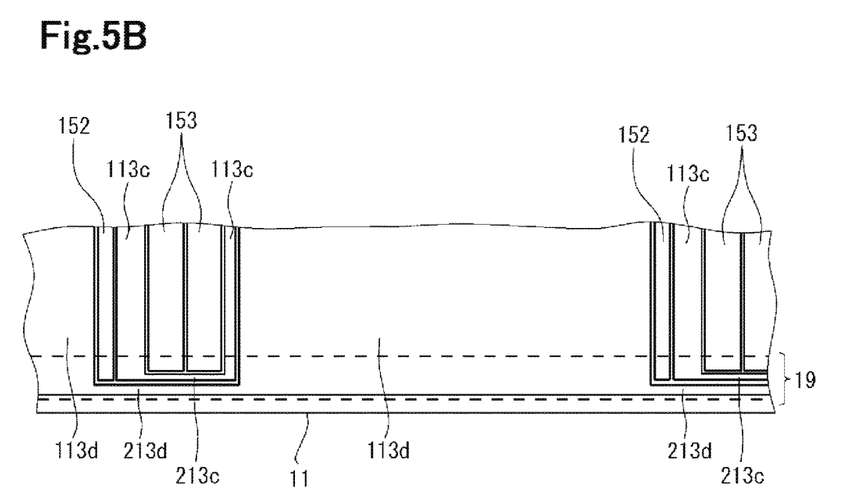
FIG. 5B is an enlarged view of area B shown in FIG. 4.

FIG. 5B is an enlarged view of area B shown in FIG. 4. As mentioned above, the first electrode 13d has a plurality of lead wirings 113d extending in the vertical direction in the figure, and each of the lead wirings 113d extends to the position where the lead wirings overlap the sealant 19. And these lead wirings 113d are mutually connected via a crossover wiring 213d disposed to overlap with the sealant 19 on the lower side of the first substrate 11. Thus, the electrode parts in the first electrode 13d which corresponds to each of the unit display regions 30a, 30b, 30c are mutually electrically connected, and the electrode parts are connected to the pad part C14 via the lead wiring provided on the right side of the first substrate 11. (Refer to FIG. 4.) Further, as shown in the figure, lead wirings 152 and 153 connected to the dummy electrode 52 and 53 respectively also extends to the position where the lead wirings overlap the sealant 19.

According to the foregoing configuration, the electrode parts of the first electrodes 13a are not mutually connected, and are separated and independent from one another and further are arranged apart from one another in the lateral direction in the figure, thereby improving the freedom of arrangement of the other dummy electrodes etc. Thus, arrangement of the dummy electrodes to areas between the unit display regions and/or the inner-segment regions, etc. is easily achieved. Therefore, it becomes possible to further reduce time necessary to eliminate the problem caused by static electricity in areas between the unit display regions and/or the inner-segment regions, etc.

Embodiment 2

The basic configuration of the liquid crystal display apparatus of embodiment 2 is the same as that of the apparatus in embodiment 1, and the main difference between the two is the configuration of the crossover wiring disposed on the first substrate. In the following, the same reference numerals are used for the components common to embodiment 1, and the detailed descriptions thereof are suitably omitted while differences are described in detail.

Figure 6:
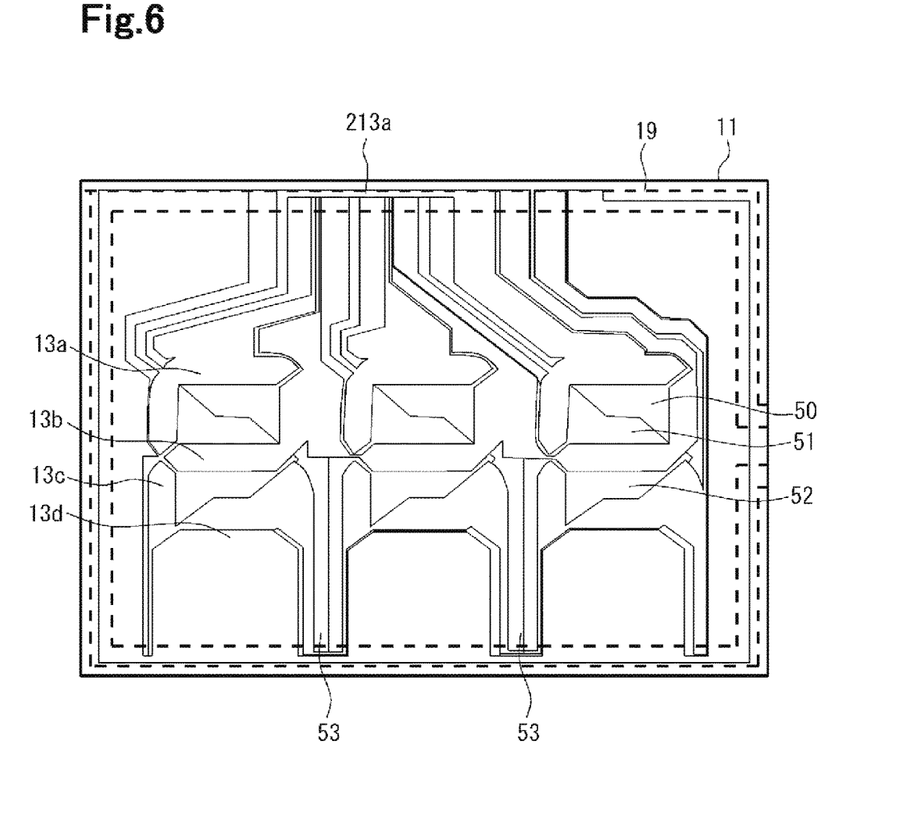
FIG. 6 is a plan view showing the configuration of the first substrate of the liquid crystal display apparatus of embodiment 2.
Figure 7:
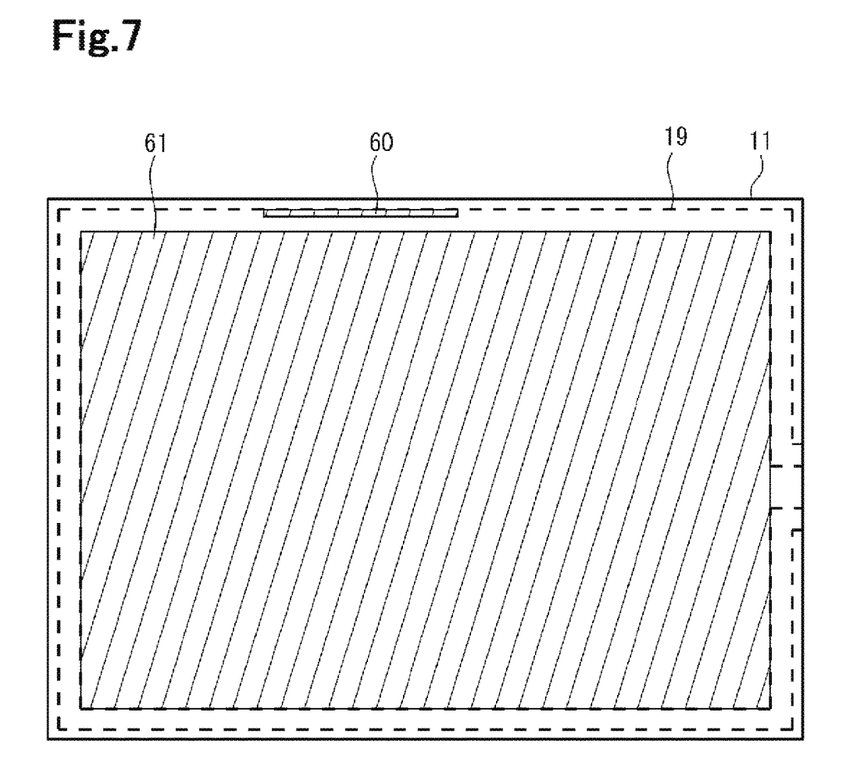
FIG. 7 is a plan view showing the configuration of the insulating film formed on first substrate 11.

FIG. 6 is a plan view showing the configuration of the first substrate of the liquid crystal display apparatus of embodiment 2. In FIG. 6, the first substrate 11 is shown in a plan view from the opposite side of where first electrodes 13 are formed. In the above-described embodiment 1, the crossover wiring 213a connecting each of the lead wirings 113a mutually are provided outside the sealant 19 located on the upper side of the first substrate 11. However, as shown in the figure, the crossover wiring 213a may be provided to overlap the sealant 19. In this case, the lead wirings of each of the dummy electrodes are offset to the inside of the sealant 19. Also, in this case, the lead wirings on the second substrate 12 side and the crossover wiring 213a on the first substrate 11 side are electrically conducted via the sealant 19. Therefore, in order to avoid this situation, as shown in FIG. 7, on the first substrate 11, an insulating film 60 needs to be provided to at least the crossover wiring 213a portion. Further, on the first substrate 11, it is preferable to provide an insulating film 61 inside where the sealant 19 is applied (within the frame). With such a configuration, the same result as embodiment 1 is also obtained. Electrical connection may be performed by using connecting technique such as Ag paste etc. as described in embodiment 1.

Embodiment 3

The basic configuration of the liquid crystal display apparatus of embodiment 3 is the same as that of the apparatus in embodiment 1 etc., and the main difference between the two is that a crossover wiring is disposed on the second substrate. In the following, the same reference numerals are used for the components common to embodiment 1, and the detailed descriptions thereof are suitably omitted while differences are described in detail.

Figure 8:
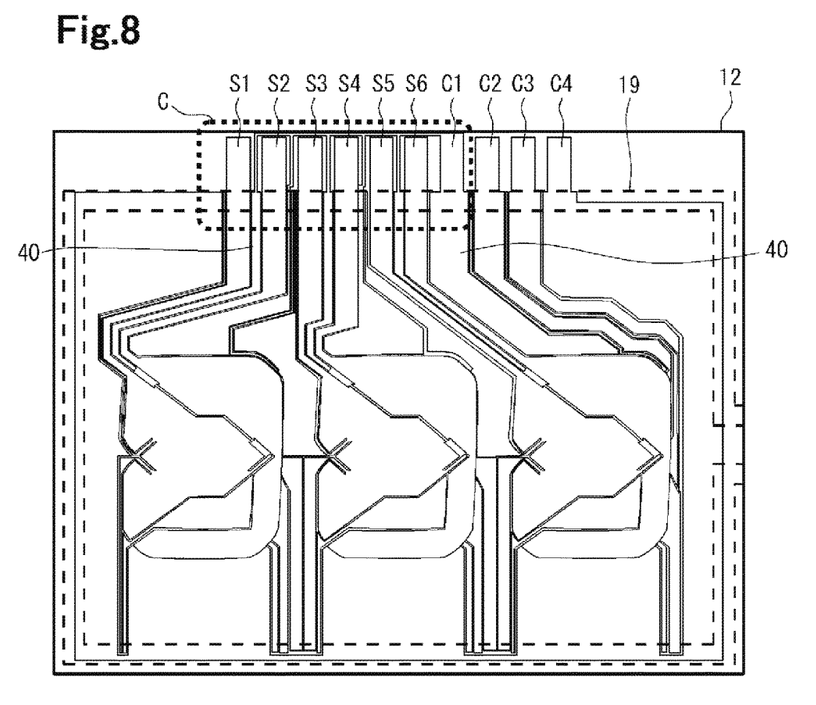
FIG. 8 is a plan view showing the configuration of the second substrate of the liquid crystal display apparatus of embodiment 3.

FIG. 8 is a plan view showing the configuration of the second substrate of the liquid crystal display apparatus of embodiment 3. In FIG. 8, the second substrate 12 is shown in a plan view from the side where second electrode 14 is formed. In the above-described embodiment 1 etc., the crossover wiring connecting each of the lead wirings mutually is provided on the first substrate 11. However, such crossover wiring configuration may be provided on the second substrate 12.

Figure 9:
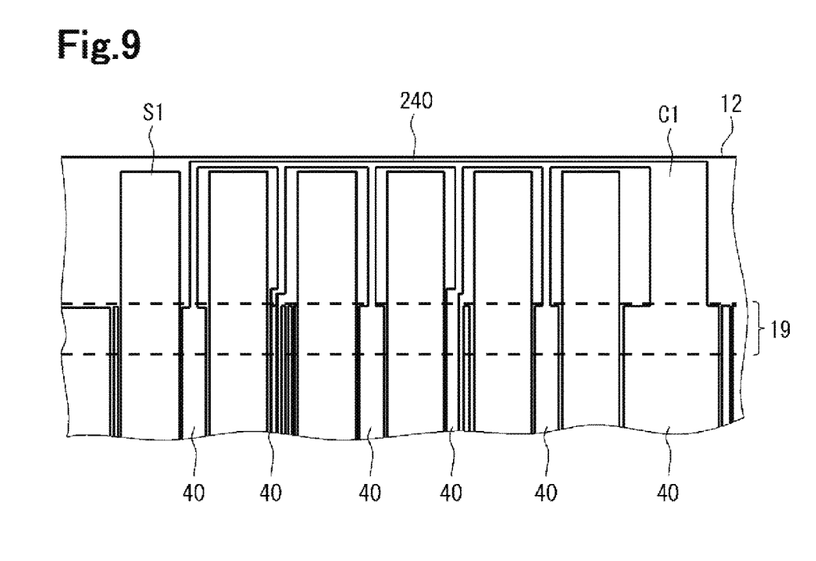
FIG. 9 is an enlarged view of area C shown in FIG. 8.
Figure 10:
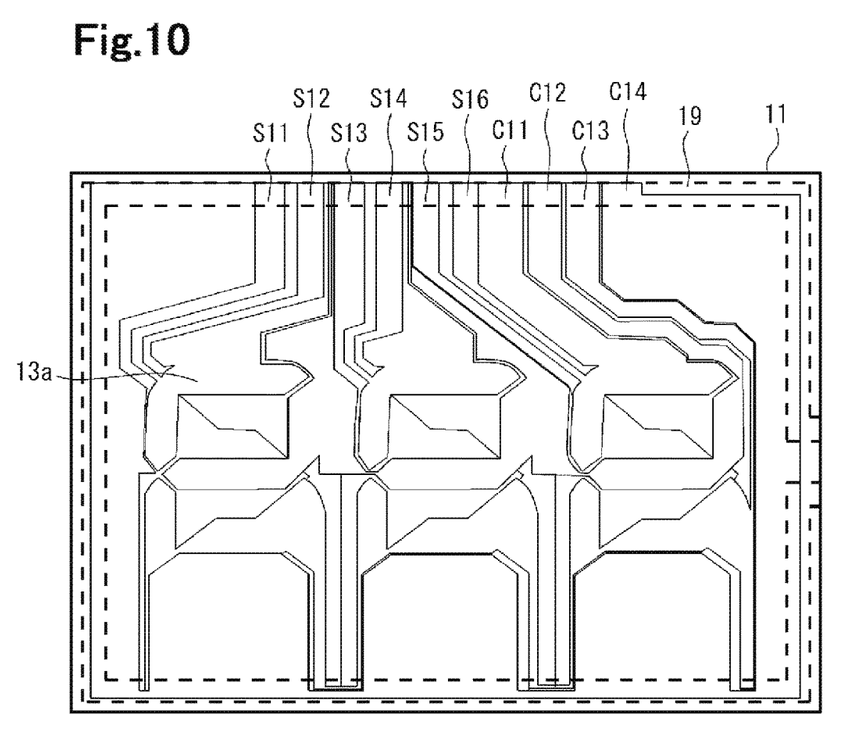
FIG. 10 is a plan view showing the configuration of the first substrate of the liquid crystal display apparatus of embodiment 3.

FIG. 9 is an enlarged view of area C shown in FIG. 8. And FIG. 10 is a plan view showing the configuration of the first substrate of the liquid crystal display apparatus of embodiment 3. In the second substrate 12, each of the dummy electrodes 40 has a plurality of lead wirings extending in the vertical direction in the figure, and each of the lead wirings extends to the position where the lead wirings overlap the sealant 19. And each of the lead wirings of the dummy electrode 40 passes through between the extraction electrodes and extends to the upper end of the second substrate 12, and the lead wirings are mutually connected via a crossover wiring 240 disposed outside the sealant 19 on the upper side and outside each of the extraction electrodes S1-S6, and further, the lead wiring are connected to the extraction electrode C1.

As shown in the figure, the crossover wiring 240 extends in the lateral direction of the second substrate 12. Here, each of the first electrodes 13a disposed on the first substrate 11 and one of the dummy electrode 40 are electrically conducted via the sealant 19. As a result, each of the first electrodes 13a are connected mutually via the crossover wiring 240, and further, these electrodes are connected to the extraction electrode C1. Therefore, as shown in FIG. 10, the crossover wiring disposed on the first substrate1 11 in embodiment 1 etc. is eliminated in this embodiment. Even with such a configuration, the same result as embodiment 1 etc. is obtained.

Here, when connecting each of the extraction electrodes to a lead frame or a flexible film, it may be possible that the crossover wiring 240 on the second substrate 12 and/or the lead wiring connected to this crossover wiring 240 are electrically conducted with the lead frame etc. Further, it may be possible that when the lead frame etc. are being fixed, the crossover wiring 240 peels off. Thus, it is preferable to provide a hard insulating film on the upper surface of the crossover wiring 240 etc. Electrical connection may be performed by using connecting technique such as Ag paste etc. described in embodiment 1.

Embodiment 4

The basic configuration of the liquid crystal display apparatus of embodiment 4 is the same as that of the apparatus in embodiment 1 etc., and the main difference between the two is that the crossover wirings are disposed on both the first substrate and the second substrate. In the following, the same reference numerals are used for the components common to embodiment 1, and the detailed descriptions thereof are suitably omitted while differences are described in detail.

Figure 11:
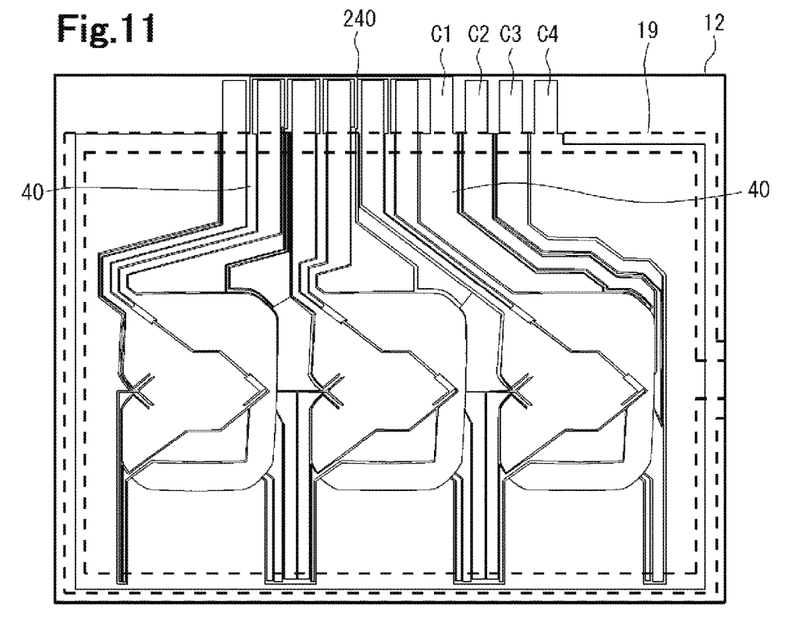
FIG. 11 is a plan view showing the configuration of the second substrate of the liquid crystal display apparatus of embodiment 4.

FIG. 11 is a plan view showing the configuration of the second substrate of the liquid crystal display apparatus of embodiment 4. In FIG. 11, the second substrate 12 is shown in a plan view from the side where second electrode 14 is formed. As in embodiment 3, in the second substrate 12, each of the dummy electrodes 40 has a plurality of lead wirings extending in the vertical direction in the figure, and each of the lead wirings extends to the position where the sealant 19 is disposed, and each of these lead wirings are mutually connected via the crossover wiring 240 and are connected to the extraction electrode C1. Each of the first electrodes 13a disposed on the first substrate 11 and one of the dummy electrodes 40 are electrically conducted via the sealant 19. As a result, each of the first electrodes 13a are electrically connected mutually via the crossover wiring 240, and further, these electrodes are connected to the extraction electrode C1.

Figure 12:
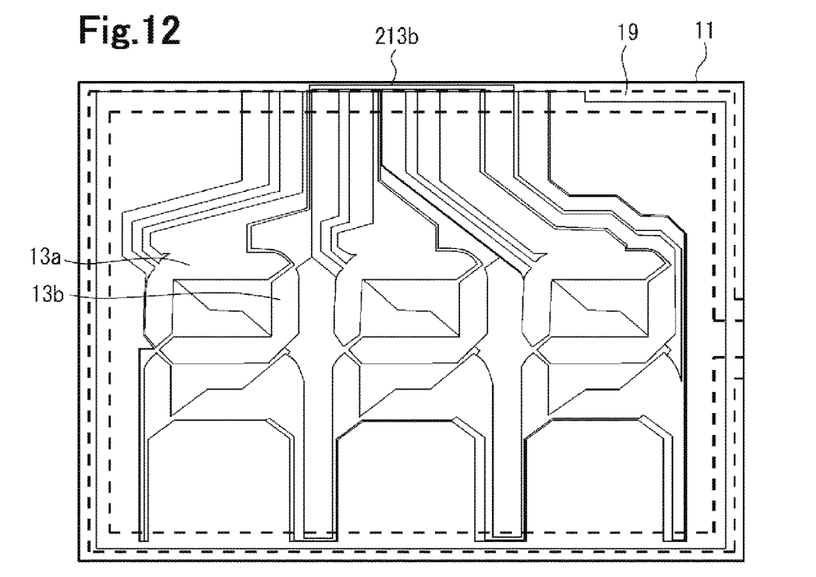
FIG. 12 is a plan view showing the configuration of the first substrate of the liquid crystal display apparatus of embodiment 4.

FIG. 12 is a plan view showing the configuration of the first substrate of the liquid crystal display apparatus of embodiment 4. In FIG. 12, the first substrate 11 is shown in a plan view from the opposite side of where the first electrodes 13 are formed. In the above-described embodiment 1 etc., the crossover wiring 213a is used to connect each of the electrode parts of the first electrodes 13a. However, in this embodiment, a crossover wiring 213b configured likewise is used to connect each of the electrode parts of the first electrodes 13b. As a result, in the lateral direction in the figure, the electrode parts of the first electrodes 13b corresponding to each of the unit display regions 30a, etc. are not mutually connected, and are separated and independent from one another.

In this embodiment, since each of the crossover wirings 213b and 240 is disposed outside of the sealant 19, neither electrical conduction between the first substrate 11 and the second substrate 12 nor erroneous lighting will occur. But in order to securely prevent short-circuit between the substrates, it is preferable to provide an insulating film at least on the upper surface of one of the corresponding electrodes and/or fill the gap between the two substrates with ultraviolet curable resin etc. Even with such a configuration, the same result as embodiment 1 etc. is obtained. Further, since each of the electrode parts of the first electrodes 13a and each of the electrode parts of the first electrodes 13b, in the lateral direction in the figure, are not mutually connected respectively, and are separated and independent from one another respectively, dummy electrodes and lead wirings can be arranged in the vertical direction between each of the electrode parts thereby improving the degree of freedom of arrangement of the other dummy electrodes etc. Electrical connection may be performed by using connecting technique such as Ag paste etc. described in embodiment 1.

Embodiment 5

The basic configuration of the liquid crystal display apparatus of embodiment 5 is the same as that of the apparatus in embodiment 1 etc., and the main difference between the two is that the function of the crossover wiring on the first substrate side and the crossover wiring on the second substrate side in embodiment 4 is different. In the following, the same reference numerals are used for the components common to embodiment 1 etc., and the detailed descriptions thereof are suitably omitted while differences are described in detail.

Figure 13:
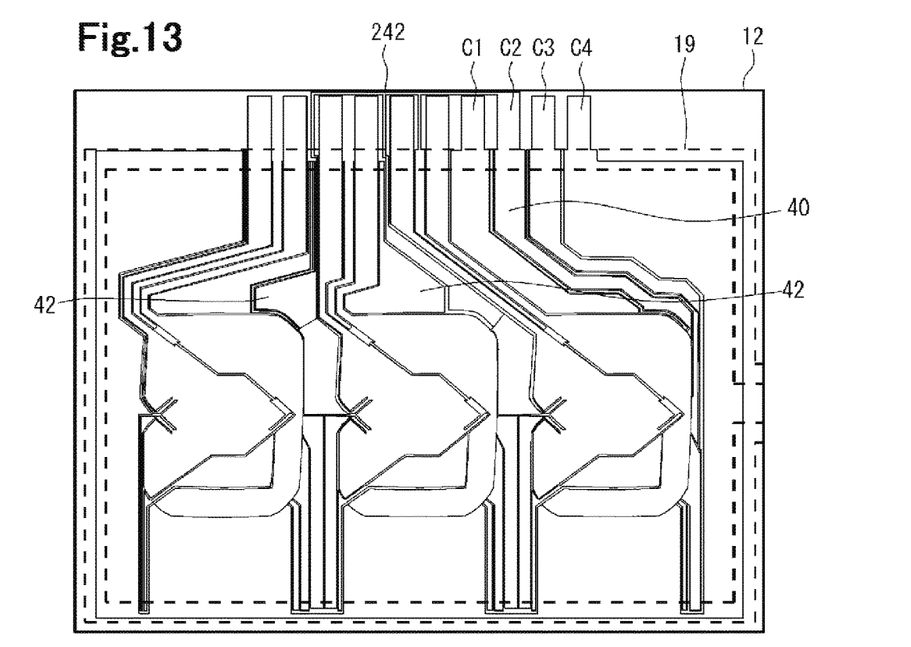
FIG. 13 is a plan view showing the configuration of the second substrate of the liquid crystal display apparatus of embodiment 5.

FIG. 13 is a plan view showing the configuration of the second substrate of the liquid crystal display apparatus of embodiment 5. In FIG. 13, the second substrate 12 is shown in a plan view from the side where the second electrode 14 is formed. As in embodiment 4, in the second substrate 12, each of the dummy electrodes 40, 42 has a plurality of lead wirings extending in the vertical direction in the figure, and each of the lead wirings extends to the position where the sealant 19 is disposed, and each of these lead wirings are mutually connected via a crossover wiring 242 and are connected to the extraction electrode C2. Each of the electrode parts of the first electrodes 13b disposed on the first substrate 11 and one of the dummy electrodes 40, 42 are electrically conducted via the sealant 19. As a result, each of the electrode parts of the first electrodes 13b are electrically connected mutually via the crossover wiring 242, and further, these electrode parts are connected to the extraction electrode C2.

Figure 14:
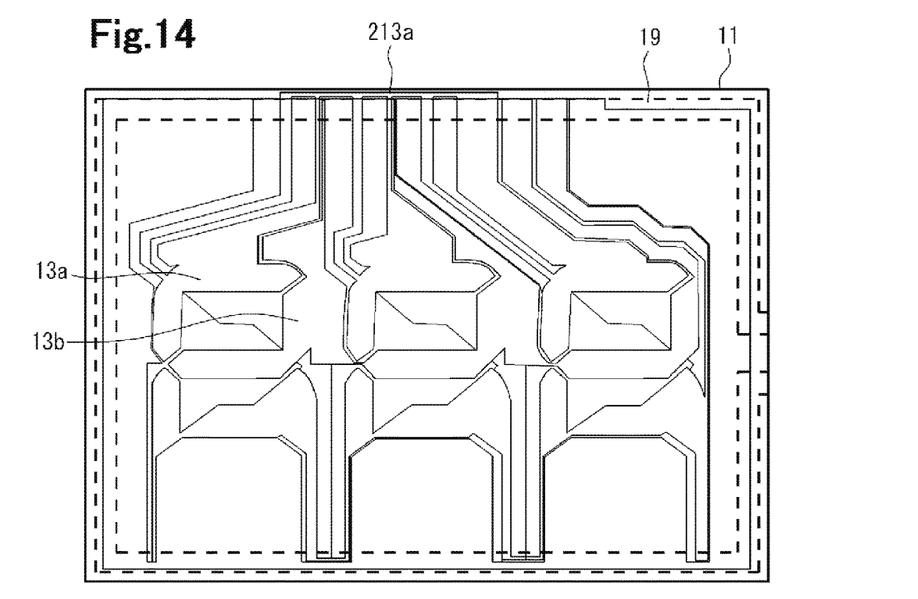
FIG. 14 is a plan view showing the configuration of the first substrate of the liquid crystal display apparatus of embodiment 5.

FIG. 14 is a plan view showing the configuration of the first substrate of the liquid crystal display apparatus of embodiment 5. In FIG. 14, the first substrate 11 is shown in a plan view from the opposite side of where first electrodes 13 are formed. In this embodiment, the crossover wiring 213a is used to connect each of the electrode parts of the first electrodes 13a. As a result, in the lateral direction in the figure, the electrode parts of the first electrodes 13a corresponding to each of the unit display regions 30a, etc. are not mutually connected, and are separated and independent from one another.

In this embodiment, since each of the crossover wirings 213a is disposed to the position which overlaps with the sealant 19, in order to prevent short-circuit between the substrates, it is necessary to provide an insulating film on the upper surface of one of the corresponding electrodes and/or fill the gap between the two substrates with ultraviolet curable resin etc. Even with such a configuration, the same result as embodiment 1 etc. is obtained. Electrical connection may be performed by using connecting technique such as Ag paste etc. described in embodiment 1.

Execution Examples

Next, an execution example of the liquid crystal display apparatus according to the present invention will be described.

As a first substrate and a second substrate, a pair of blue plate glass substrates (thickness of 0.7 mm) where an ITO (indium tin oxide) conductive film is formed on each of its surface is prepared. In order to form the conductive films of each of the glass substrates into a preferred display pattern, a photolithography process and an etching process are used to each of the substrates.

Next, including at least the effective display region of each of the substrate surfaces, insulating film of $SiO_2$ or the like is formed into a preferred pattern within the surface. Subsequently, as in the case of the insulating film, including at least the effective display region, a vertical alignment film is formed, and the substrates are heated at 180-220° C.

Next, on the vertical alignment film, a cotton rubbing cloth where the cloth thickness is 2.8 to 3.2 mm is used to perform the rubbing process in one direction. Rubbing conditions of the rubbing process is set so that the pretilt angle of the completed liquid crystal display apparatus becomes 88.5°-89.9°.

On the surface of one of the substrates (e.g., on the first substrate) where the alignment film is formed, sealant is applied in a frame-like shape to enclose the area larger than the effective display region. The sealant is mixed with 1.5 wt % of glass fiber spacers having a diameter of 4.2 µm, and plastic balls coated with gold having a diameter of 4.5 µm to ensure electric conductivity between the substrates, respectively.

Now, when plastic balls coated with gold are not used, Ag paste is disposed by potting or screen printing, etc. to the area where electric conductivity of the other substrate (e.g., the second substrate) is needed.

On the other substrate (e.g., the second substrate), plastic balls having a diameter of 4.0 µm were sprayed and disposed at the density of 100 pieces per square millimeter using a dry-spraying method.

The first substrate and the second substrate are aligned and overlaid so that each of the alignment films faces each other, and while both substrates are pressed, they are baked at 150° C. A necessary and sufficient period of time for baking is set for the sealant to cure.

Next, a liquid crystal material with a negative dielectric anisotropy is injected between the bonded first substrate and second substrate using a vacuum injection method, and the port is sealed by ultraviolet curable resin, then baked for one hour at 120° C.

The surfaces of the bonded substrates are washed with a neutral detergent, then a viewing angle compensator and a polarizer is disposed to each of the substrate surfaces in the fore-stated stacking order.

Lead-out electrodes are disposed to the area where an outer side of one substrate (the second substrate) protrudes to the outside of the other substrate (the first substrate), and thus, a lead frame, a flexible film via an anisotropic conductive film, and a driver IC are bonded to these electrodes.

Lastly, by connecting an external driving unit to the lead-out electrodes, then installing a reflecting plate or a back light to the lower side of the rear polarizer, the liquid crystal display apparatus is completed. With regard to the execution example of the liquid crystal display apparatus, the lower substrate (the second substrate) of the panel part is 27.5 mm height×25 mm width, and the length of the lead-out electrodes is 2.5 mm. Of 25 by 25 mm square where the two substrates overlap, the effective display region is inside this overlapping area with approximately 22 by 22 mm square, and sealant is disposed within the remaining 3 mm margin.

Based on the manufacturing method described above, liquid crystal display apparatus corresponding to embodiments 1 to 5 were prepared, and when the protective films disposed on the surface of each of the polarizer were peeled off, the existence of abnormal lighting was visually checked, and consequently, no abnormal lighting was observed. From this observation, based on each configuration of the foregoing embodiments, it is proven that the abnormal lighting caused by charged static electricity has been drastically suppressed.

Note that this invention is not limited to the subject matter of the foregoing embodiments, and can be implemented by being variously modified within the scope of the gist of the present invention.

What is claimed is:

1. A liquid crystal display apparatus comprising:
a first substrate having a plurality of first electrodes and a plurality of first dummy electrodes,
a second substrate having a plurality of second electrodes and a plurality of second dummy electrodes,
a liquid crystal layer disposed between the first substrate and the second substrate,
sealant provided between the a first substrate and the second substrate and surrounding the liquid crystal layer,
a conductive part disposed in the vicinity of the sealant or included in the sealant to provide conduction between the first substrate and the second substrate, wherein:
an inner area surrounded by the sealant includes a plurality of unit display regions where each of said plurality of unit display regions is a minimum region including all of a plurality of segment display sections where each of said plurality of segment display sections represents a symbol with a meaning, and each of said plurality of unit display regions is arranged along a first direction spaced from one another,
each of said plurality of segment display sections is defined as the area where one of said plurality of first electrodes and one of said plurality of second electrodes overlap, and
at least one of said plurality of first electrodes has,
a plurality of electrode parts corresponding to each of said plurality of unit display regions and are mutually separated and arranged apart from one another in said first direction,
a plurality of first lead wirings where each first lead wiring extends in the direction different from said first direction and extends outside said inner area, and
a first crossover wiring disposed outside said inner area and mutually connects said plurality of first lead wirings.

2. The liquid crystal display apparatus according to claim 1, wherein:
the first crossover wiring is provided outside the sealant.

3. The liquid crystal display apparatus according to claim 2, wherein:
some of said plurality of first dummy electrodes correspond to inner-segment regions where each region is surrounded by at least two of said plurality of segment display sections, and wherein:
the first dummy electrode corresponding to said inner-segment region has
a first dummy lead wiring that passes through between the areas of said plurality of electrode parts of said at least one of the plurality of first electrodes and extends outside said inner area.

4. The liquid crystal display apparatus according to claim 2, wherein:
two or more of said plurality of second dummy electrodes have
a plurality of second dummy lead wirings where each wiring extends along in the direction different from said first direction and extends outside said inner area, and
a second crossover wiring disposed outside said inner area and mutually connects said plurality of second dummy lead wirings, and wherein:
the other one of said plurality of first electrodes has
a plurality of electrode parts corresponding to each of said plurality of unit display regions and are mutually separated and arranged apart from one another in said first direction and
a plurality of third lead wirings where each third lead wiring extends in the direction different from said first direction and extends outside said inner area, and wherein:
said plurality of second dummy lead wirings and said plurality of third lead wirings are electrically conducted via said sealant thereby said plurality of electrode parts of the other one of said plurality of first electrodes are mutually electrically conducted.

5. The liquid crystal display apparatus according to claim 1, wherein:
the first crossover wiring is provided to the position overlapping said sealant, and
the first substrate further comprises an insulating film disposed to cover at least said crossover wiring.

6. The liquid crystal display apparatus according to claim 5, wherein:
some of said plurality of first dummy electrodes correspond to inner-segment regions where each region is surrounded by at least two of said plurality of segment display sections, and wherein:
the first dummy electrode corresponding to said inner-segment region has
a first dummy lead wiring that passes through between the areas of said plurality of electrode parts of said at least one of the plurality of first electrodes and extends outside said inner area.

7. The liquid crystal display apparatus according to claim 5, wherein:
two or more of said plurality of second dummy electrodes have
a plurality of second dummy lead wirings where each wiring extends along in the direction different from said first direction and extends outside said inner area, and
a second crossover wiring disposed outside said inner area and mutually connects said plurality of second dummy lead wirings, and wherein:
the other one of said plurality of first electrodes has
a plurality of electrode parts corresponding to each of said plurality of unit display regions and are mutually separated and arranged apart from one another in said first direction and
a plurality of third lead wirings where each third lead wiring extends in the direction different from said first direction and extends outside said inner area, and wherein:
said plurality of second dummy lead wirings and said plurality of third lead wirings are electrically conducted via said sealant thereby said plurality of electrode parts of the other one of said plurality of first electrodes are mutually electrically conducted.

8. The liquid crystal display apparatus according to claim 1, wherein:
some of said plurality of first dummy electrodes correspond to inner-segment regions where each region is surrounded by at least two of said plurality of segment display sections, and wherein:

the first dummy electrode corresponding to said inner-segment region has a first dummy lead wiring that passes through between the areas of said plurality of electrode parts of said at least one of the plurality of first electrodes and extends outside said inner area.

9. The liquid crystal display apparatus according to claim 1, wherein:

two or more of said plurality of second dummy electrodes have a plurality of second dummy lead wirings where each wiring extends along in the direction different from said first direction and extends outside said inner area, and a second crossover wiring disposed outside said inner area and mutually connects said plurality of second dummy lead wirings, and wherein:

the other one of said plurality of first electrodes has a plurality of electrode parts corresponding to each of said plurality of unit display regions and are mutually separated and arranged apart from one another in said first direction and a plurality of third lead wirings where each third lead wiring extends in the direction different from said first direction and extends outside said inner area, and wherein:

said plurality of second dummy lead wirings and said plurality of third lead wirings are electrically conducted via said sealant thereby said plurality of electrode parts of the other one of said plurality of first electrodes are mutually electrically conducted.

* * * * *